Figure 1:
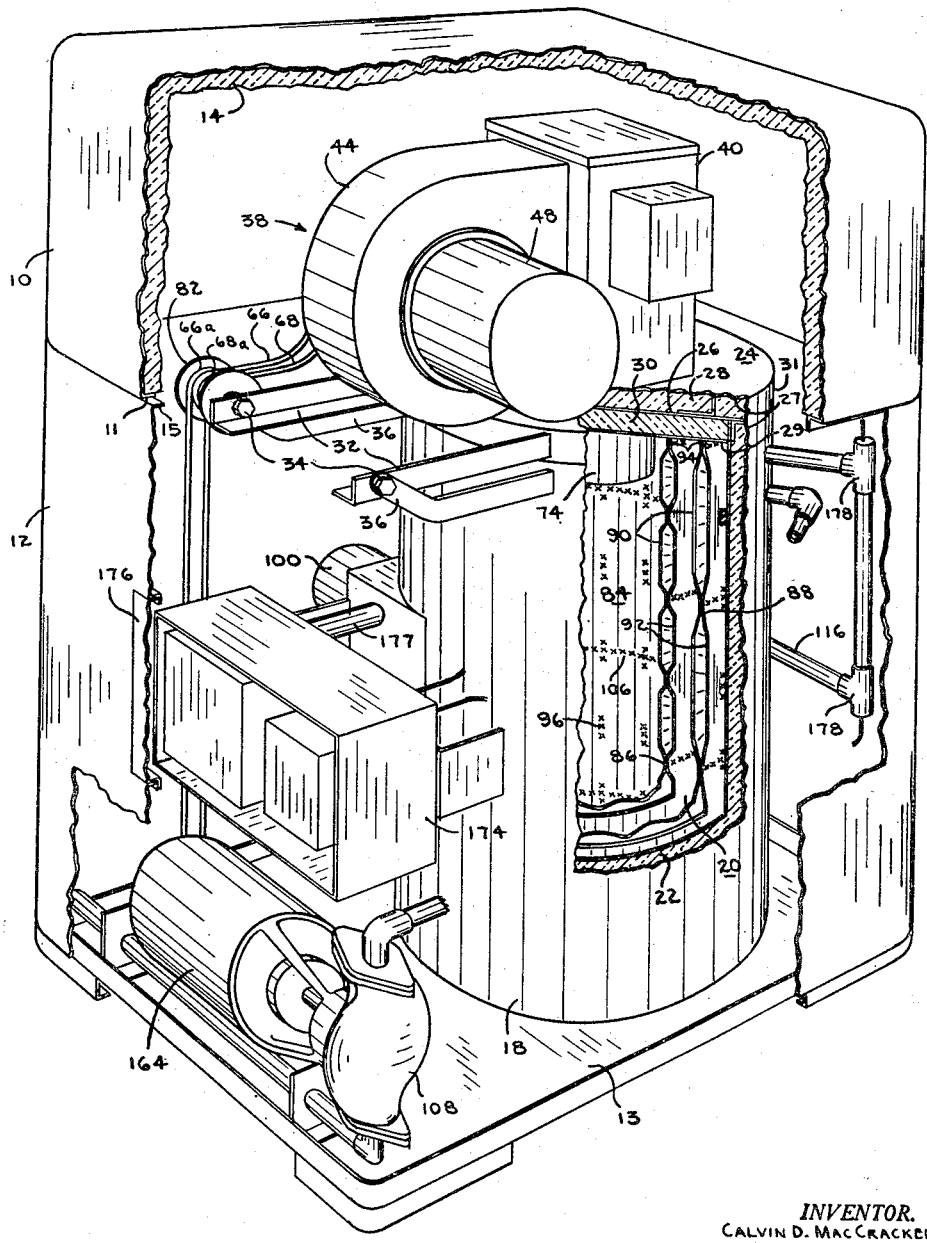

INVENTOR.
CALVIN D. MACCRACKEN.
GEORGE N. MILES.
TOSHI N. ASHIDATE.
BY James M. Relph
ATTORNEY Dec. 11, 1956  C. D. MAC CRACKEN ET AL  2,773,488
BOILER-BURNER UNIT
Filed Feb. 21, 1952  3 Sheets-Sheet 2
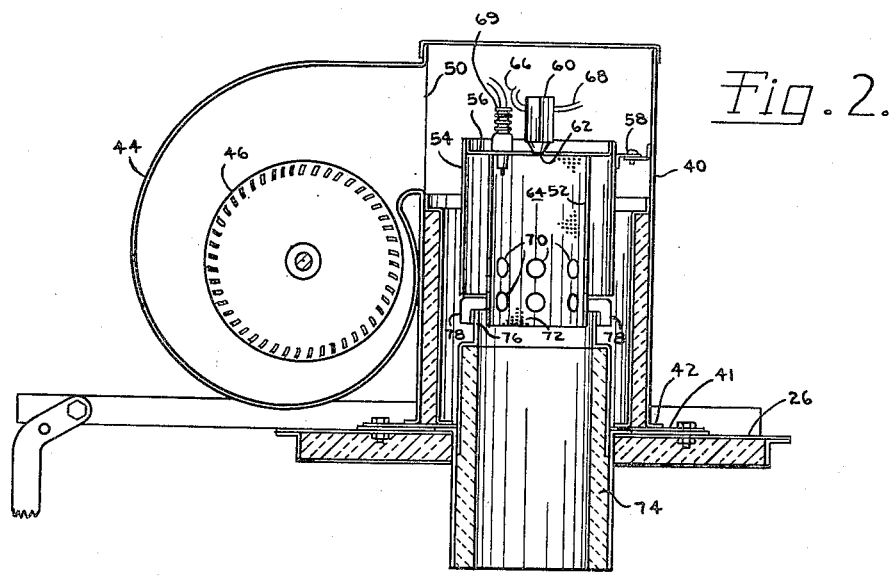
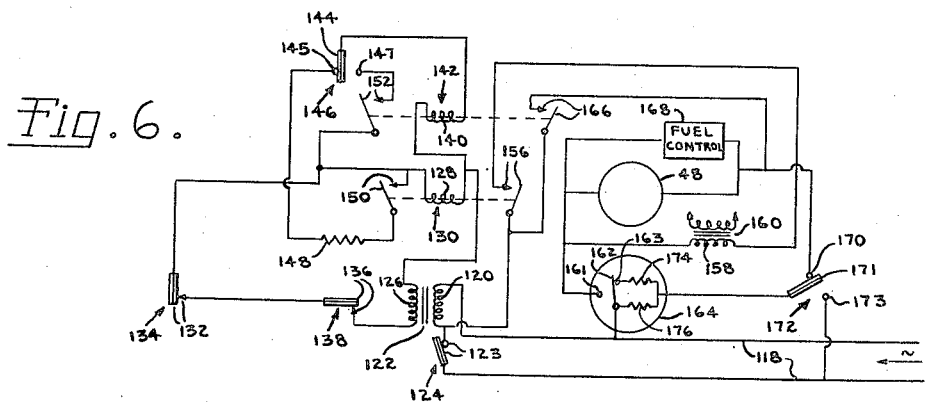
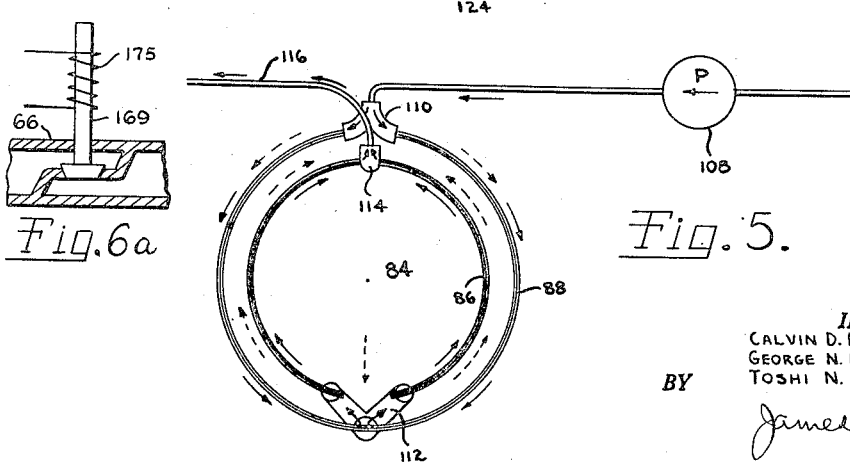
INVENTOR.
CALVIN D. MAC CRACKEN
GEORGE N. MILES
TOSHI N. ASHIDATE
BY
ATTORNEY

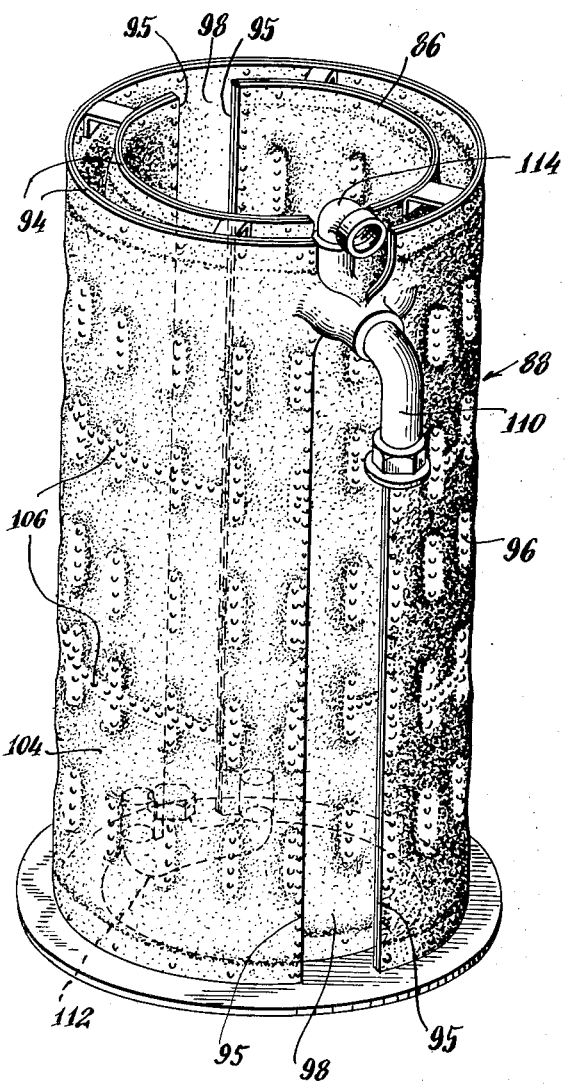
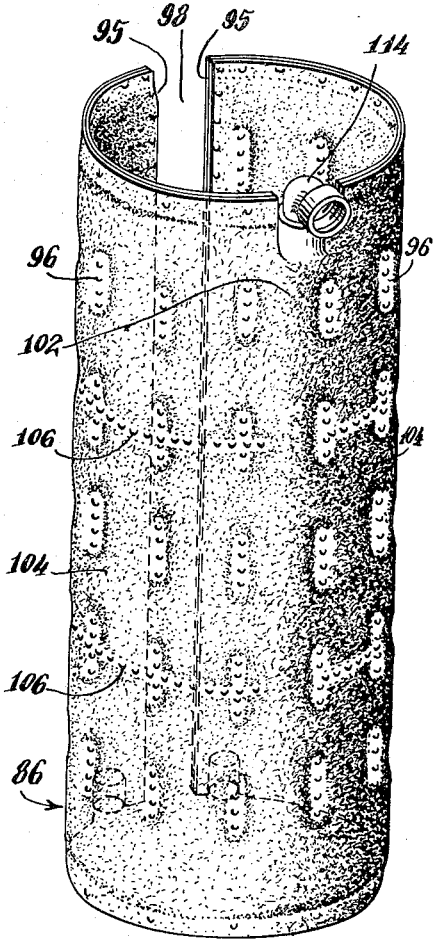

# United States Patent Office 2,773,488
Patented Dec. 11, 1956

2,773,488

BOILER-BURNER UNIT

Calvin D. MacCracken, Tenafly, N. J., George N. Miles, Orangeburg, N. Y., and Toshi N. Ashidate, Bergenfield, N. J., assignors to Jet-Heet, Inc., Englewood, N. J., a corporation of New York Application February 21, 1952, Serial No. 272,783

9 Claims. (Cl. 122—161)

This invention relates to improvements in heating systems, and particularly to an improved boiler-burner unit for a hot water heating system.

Important objects of the present invention are to provide an improved, high efficiency boiler-burner unit that is compact, light in weight and relatively inexpensive to manufacture, assemble and install; to provide a boiler-burner unit that is extremely easy to clean and service; and to provide a boiler-burner unit that is designed for safe operation, high efficiency and relatively long service life.

In accordance with the invention, the foregoing and other related objects and advantages are attained in a boiler-burner unit wherein a high velocity burner is combined with a thin-walled, multi-layer water jacket. Preferably, the water jacket is formed of sheet metal and has quilt-like surfaces, contributing substantially to ease of manufacture, reduced weight and high efficiency. For ease of servicing, the burner preferably is mounted on a hinged plate for operation either inside or outside the boiler portion of the unit and without disassembly.

A more complete understanding of the invention, and of further objects and features thereof, can be obtained from the following description of illustrative embodiments thereof, when considered in connection with the accompanying drawing, wherein Fig. 1 is a perspective view of a boiler-burner unit embodying the invention, with certain of the parts broken away to reveal internal structural details, Fig. 2 is a cross sectional view of a preferred type of high velocity burner for the boiler-burner unit of Fig. 1, Fig. 3 is a line drawing of a preferred type of boiler or water jacket for the boiler-burner unit of Fig. 1, Fig. 4 is a line drawing showing one section of the assembled boiler of Fig. 3, Fig. 5 is a schematic diagram showing the flow path of the water and the combustion gases in the boiler of Figs. 1 and 3, Fig. 6 is a wiring diagram of a preferred control circuit for the Fig. 1 boiler-burner unit, and Fig. 6a is a schematic diagram of the fuel control in Fig. 6.

Referring to Fig. 1 of the drawing, a boiler-burner unit arranged in accordance with the invention includes a generally rectangular, upright outer casing having separable upper and lower sections 10, 12, and a bottom wall 13. Preferably, the upper section 10 is lined with insulating material 14, such as glass wool or the like. As stated, the sections 10, 12 are separable, the upper section 10 having a supporting flange 11 which seats on a cooperating flange 15 on the lower section 12 so that the upper section 10 can be readily removed for easy access to the components described hereinafter.

A generally cylindrical inner casing 18, standing on end in the bottom outer casing section 12, encloses a multilayer water jacket or boiler 20, described in detail hereinafter.

The inner casing 18 also has an insulating lining 22, and is provided with an insulated cover 24. The cover 24 comprises three parallel plate members 26, 27, 29, separated by layers of insulating material 28, 30. The upper plate has a depending flange 31 forming a continuation of the outer wall of the casing 18 when the cover 24 is closed.

The cover 24 is hinged to the inner casing 18 by means of a pair of angle irons 32, welded or otherwise fixed to the middle cover plate 26 and extending an appreciable distance beyond the edge of the plate 26 to be pivotally secured by bolts 34 to a second pair of angle irons 36 that extend outwardly and upwardly from the inner casing 18. This construction allows the cover plate 24 to be tilted up and somewhat away from the casing 18 to expose the discharge section of a high velocity burner assembly 38 that is mounted on the cover plate 24.

In conventional hot water heating systems, the boiler-burner units usually are bulky, heavy and relatively expensive components, typically including a thick-walled cast iron boiler having large flue gas passages and considerable water capacity, combined with a burner and combustion chamber that is adapted to provide a relatively low velocity flow of hot gaseous combustion products to heat the water in the boiler. The term "low velocity burner" is used herein to designate a burner that is adapted to deliver hot gaseous combustion products at a velocity lower than the velocity of flame propagation of the fuel supplied to the burner. Typical examples of such burners are the so-called "pot" and "gun" type oil burners. In these and similar low velocity burners, the velocity at which combustion gas leaves the burner and combustion chamber cannot exceed the velocity of flame propagation of the fuel supplied to the burner, as higher velocities would "blow out" the flame in the burner. With the velocity of combustion gas delivery thus limited, the conventional boiler structure has been provided with large flue gas passageways in order that the low velocity gases could pass through rapidly enough to effect reasonably efficient heat transfer to the heat exchange surfaces of the boiler. Of course, such large area flue gas passages contribute materially to the overall size of the unit.

In accordance with an important feature of the present invention, a high velocity burner assembly is combined with a restricted gas passageway boiler structure to provide a compact, highly efficient boiler-burner unit.

A preferred type of high velocity burner is shown in detail in Fig. 2 of the drawing. A burner of generally similar structure is described in greater detail and claimed in a copending application of C. D. MacCracken, Serial No. 272,782, filed February 21, 1952, and assigned to the assignee of the present invention.

The burner shown in Fig. 2 includes an elongated rectangular housing 40 which contains the various elements making up the burner head as described hereinafter. A flange 42 at the discharge end of the housing 40 is welded or otherwise suitably secured to a mounting plate 41 that is bolted to the central cover plate 26 to hold the burner assembly in position on the cover 24.

A hollow casing 44 at one side of the housing 40 encloses a sirocco type blower or fan 46 for supplying air at relatively high velocity to the combustion section of the unit. The usual motor 48 (see Fig. 1) for driving both the fan 46 and a fuel pump (not shown) is suitably secured to one side of the casing 44. Other accessories (not shown) such as a transformer for supplying the proper voltage for ignition, a fuel control valve and fuel line fittings also are carried by the casing 44 or the housing 40.

The casing 44 opens into the housing 40 through an opening 50 in one side of the housing 40 adjacent the closed end thereof to provide for delivery of air from the blower 46 to the combustion section of the unit. For convenience of discussion, the portion of the housing 40 into which the blower 46 discharges will be referred to hereinafter as the "inlet" end or section of the housing, while the opposite end of the housing 40 will be referred to as the discharge end.

Adjacent the inlet end of the housing 40, there is mounted a high velocity burner head, comprising a pair of cylindrical sleeves 52, 54 disposed one within the other and held in spaced coaxial relation by an end wall 56. The sleeves 52, 54 are supported by a mounting tab 58 extending from the inside wall of the housing 40 and suitably secured to the outer sleeve 54.

While the burner presently being described will burn either liquid or gaseous fluid fuel, it will be described herein as arranged for liquid fuel burning. Accordingly, an atomizing nozzle 60 is mounted on the end wall 56 to discharge atomized fuel through an end wall opening 62 into the combustion space 64 defined by the inner sleeve 52. Preferably, the nozzle 60 is of the so-called return flow type, such as the nozzle described in U. S. Patent 2,567,818—MacCracken. Fuel supply and return lines 66, 68 are connected to the nozzle 60. The usual spark igniter 69 extends through the end wall 56 into the combustion space 64.

The inner sleeve 52 is provided with several series of laterally aligned relatively large holes 70 for admitting combustion air, and both the end plate 56 and the inner sleeve 52 preferably are provided with a large number of closely spaced, relatively small holes or perforations 72, arranged to prevent carbon formation in the manner described and claimed in the copending application of C. D. MacCracken, Serial No. 277,185, filed March 18, 1952, now Patent 2,692,014 and assigned to the assignee of the present invention.

The combustion space 64 defined by the inner sleeve 52 is extended beyond the discharge end of the housing 40 by a cylindrical sleeve 74 of refractory material. The outer diameter of the sleeve 74 is substantially the same as the diameter of the outer sleeve 54, while the inner diameter of the sleeve 74 is slightly greater than the diameter of the inner sleeve 52. The refractory sleeve 74 terminates a short distance from the end of the inner sleeve 52. The gap between the two sleeves 52, 74 is bridged by a metal collar 76 which forms an extension of the inner surface of the refractory sleeve 74 and which slightly overlaps the end of the inner sleeve 52. A plurality of L-shaped lugs 78 mounted radially on the collar 76 project beyond the collar 76 toward the inlet end of the housing 40 and extend inwardly a slight distance past the inner surface of the collar 76 to engage the outer surface of the inner sleeve 52, thereby maintaining the collar 76 and the sleeve 52 in accurate coaxial alignment with a small annular space between sleeve and collar.

The burner head assembly just described constitutes a high velocity unit, capable of delivering hot gaseous combustion products at a rate substantially in excess of the rate of flame propagation of the fuel supplied thereto. Air from the blower 46 will flow into the housing 40, then down along the outside of the outer sleeve 54, then back up into the space between the sleeves 52, 54, and will enter the combustion chamber 64 in discrete, radially directed jets through the large holes 70 in the inner sleeve. As these jets of air impinge on each other at the center of the combustion chamber, some of the air will flow up toward the end wall 56, then radially outward along the end wall 56, and then downward along the inside surface of the inner sleeve 52. This air flow pattern will create a vortex or ring in the area between the inlet ports 70 and the closed end 56 of the combustion chamber. By virtue of the reversal of direction of air flow, an area of substantially zero velocity air flow is created within the toroidal flow area, and the nozzle 60 is arranged to discharge fuel into this relatively dead air space. By burning the atomized fuel in this low velocity region, it becomes possible to have gases (air and combustion products) flow into and out of the combustion chamber 64 at a velocity much greater than the velocity of flame propagation of the fuel being burned, without blowing out the flame.

The space between the sleeve 52 and the collar 76 allows a cooling blanket of air to flow along the inside surface of the refractory sleeve 74, as well as providing a further supply of air for ensuring complete combustion of the fuel.

In addition to providing high velocity flow of hot gaseous combustion products, with the advantages attendant thereon explained hereinafter, the burner just described has further advantages in a boiler-burner unit of the type being described, both as to operation and as to servicing. Burners of this type do not require carefully sealed combustion spaces as they are relatively insensitive to drafts. In fact, it is entirely feasible to operate the burner 38 in open air. Accordingly, in the apparatus of Fig. 1, the cover 24 with the burner 38 thereon can be tilted up and the burner operated in open air to facilitate preliminary adjustment and to allow visual study of the operation of the burner 38 if servicing is necessary. In accordance with a further feature of the invention, and having in mind the possibility of operating the burner 38 with the cover 24 up or down, the fuel lines 66, 68 leading to and from the burner 38 are provided with flexible portions by making the same of relatively ductile metal, such as copper or the like, and coiling sections 66a, 68a thereof in several turns on a spool 82 that conveniently can be mounted on one of the hinge bolts 34. As the cover 24 is raised and lowered, these coil sections 66a, 68a will have enough flexibility to allow the burner end of the fuel lines to be moved without rupturing the fuel lines and without putting undue strain on the connection fittings.

When the cover 24 is closed, the burner assembly 38 will be disposed to discharge hot gaseous combustion products downwardly into generally cylindrical space 84 in the center of the boiler 20.

In order to take fullest possible advantage of the high velocity flow of hot gaseous combustion products that will be provided by the burner assembly, and to achieve the previously stated objective of keeping the size and weight of the complete unit as small as possible, a boiler unit is required that will present the maximum possible surface to the burning gases and to the resulting flow of hot gases from the burner, within a small total volume. As compared with the large water capacity, generally thick-walled boiler structures of the prior art, in accordance with the present invention there is provided a thin-walled, low-water-capacity water jacket, through which a comparatively thin film of water to be heated is circulated in order to heat the same very quickly when the burner is started. For space conservation, a curved surface multi-layer water jacket is utilized, with the spacing between adjacent jacket layers being restricted to take fullest advantage of the high velocity combustion gas flow in the least possible space.

In a copending application of R. E. Coleman et al., Serial No. 272,781 filed concurrently herewith and assigned to the assignee of the present invention and now abandoned, there is described and claimed a water jacket or boiler structure that is particularly suitable for use in a boiler-burner unit of the type presently being considered. Briefly, the structure described in said copending Coleman et al. application comprises a pair of thin metal sheets sealed together along their edges and at a plurality of spaced points intermediate the edges, bent to a desired curved shape, and separated except where sealed together to provide an envelope having a quilt-like surface.

While such a structure as has just been described may take a number of different specific forms (e. g., spiral, cylindrical, etc.), from the standpoint of ease of manufacture a generally cylindrical configuration has been found most satisfactory.

For example, as shown in Figs. 1 and 3, the boiler 20 may be made up of two similar coaxially arranged envelope sections 86, 88. In order to show the boiler construction clearly, one completed boiler section 86 is shown separately in Fig. 4, and the assembled boiler sections 86, 88 are shown in Fig. 3 without the casing 18. The cross sectional appearance of the boiler sections 86, 88 can be seen in Fig. 1, showing the thin metal walls 90, 92 of sheet metal or the like, sealed together at their edges 94 and along a plurality of spaced lines 96 and 106 between the edges 94.

In the process of fabricating the boiler sections, after the walls 90, 92 are welded or otherwise sealed together, they are passed through rollers to be bent substantially into the shape of a cylinder, with the edges 95 (see Figs. 3 and 4) that comprised the ends of the original sheets being brought close together but left spaced slightly apart to define a longitudinal slot 98 running from end to end of the cylinder. Fluid is then introduced between the sheets 90, 92 (through any suitable opening left for that purpose, as at one corner thereof, for example) under sufficient pressure to cause the sheets 90, 92 to expand into a quilt-like envelope.

In the embodiment of the invention presently being described, the two sections 86, 88 are disposed one within the other in coaxial relation (see Figs. 1 and 3), with the longitudinal openings 98 being on opposite sides of the assembled boiler sections 86, 88. As shown schematically by the broken line arrows in Fig. 5, there are thus provided two similar passageways for flue gases. These passageways extend from the cylindrical space 84 encompassed by the inner jacket 86 to outside the outermost jacket 88. The length of the boiler sections 86, 88 preferably is such that the open upper ends thereof terminate just short of the upper end of the casing 18 so as to be closed by the lower plate 29 of the cover 24. With this arrangement, when the assembled boiler sections 86, 88 are set on end inside the inner casing 18, the flue gas passageways are extended around the outside of the outer jacket 88 to communicate with an outlet flue 100 (see Fig. 1).

Thus, it can be seen that all surfaces of the multilayer water jacket 20 will be exposed to the high velocity hot combustion gases discharged by the burner assembly 38. Furthermore, substantially the entire inner surface of the inner boiler section 86 will be exposed to flame issuing from the burner 38, and hence will be heated by direct radiation. The heat transfer characteristics of the unit are further improved by the quilt-like surfaces of the boiler sections 86, 88 which induce considerable turbulence in the combustion gases, causing a scouring effect which brings the combustion gases into extremely intimate contact with the water jacket surfaces and thereby considerably improves the heat transfer.

The water flow pattern through the boiler is similar to the combustion gas flow pattern, in that two flow paths in parallel, are provided. Each of the boiler sections is arranged to have three vertical "bulges" 102 running from end to end thereof (see Fig. 4), providing three vertical internal passages or headers, one on each side of the longitudinal slot 98 and one on the side opposite to the longitudinal slot. These longitudinal passages are joined by a plurality of lateral passages provided by lateral "bulges" 104, alternate ones of which are separated by continuous lines of sealage 106. As shown schematically by the full line arrows in Fig. 5, water is brought into the outer jacket 88 from a circulating pump 108 through a curved T-fitting 110 which enters the outer jacket 88 on opposite sides of the slot 98. The flow path then extends in opposite directions through the spaces inside the outer jacket walls. A second curved T-fitting 112 connects the outer and inner jackets 86, 88, to extend the flow pattern along a second pair of parallel paths inside the inner jacket 86, and then through an inner jacket outlet fitting 114 to a line 116 leading to radiators or the like (not shown). With this arrangement, the flue gases and the water to be heated will be in so-called counterflow relation throughout part of the adjacent flow paths thereof, so that the log mean temperature difference between the water and the hot gases will be as great as possible for maximum heat transfer.

The purpose of having curved T-fittings 110, 112 instead of the more conventional "right angle" T's is to reduce as much as possible the pressure drop encountered in forcing water through the boiler. It will be understood that the cross-sectional dimensions of the water passages between the walls 90, 92 are not very large, making the pressure drop greater inside the boiler than it would be in the more conventional large water capacity boiler. Accordingly, in order to obtain proper water circulation through the boiler and the associated radiators with a circulating pump of standard output, it is important to keep the pressure drop as small as possible at every point in the water flow path. However, the design problems involved due to the relatively high pressure drop in the boiler are not particularly troublesome, and are more than compensated by the advantages attendant on combining a boiler of this type with a high velocity burner.

As previously mentioned, the conventional boiler with its relatively large combustion gas and water passages generally appears in combination with a low velocity burner because of the difficulty of getting sufficient draft to draw combustion gases at reasonable heat transfer velocities from a low velocity burner through narrow gas passages such as the gas passages available in the boiler 20 of the present invention. These large flue gas passage boilers, of course, materially detract from compactness of design. Moreover, the water capacity of such boilers usually gives rise to an appreciable time lapse after the burner comes on before hot water is available in the system.

In the boiler-burner unit of the present invention, the high velocity delivery of hot combustion products from the burner makes it entirely feasible to have the flue gas passages very small in cross sectional area with good heat transfer, even though practically no draft is available at the outlet flue. At the same time, the very thin film of water in the small area space between the walls 90, 92, together with the rapid heat transfer characteristics of the thin walls themselves, insures almost instantaneous delivery of hot water from the boiler.

By way of example, in one boiler-burner unit constructed in accordance with the present invention, substantially in the form shown in Fig. 1 of the drawing, the mean diameter of the assembled boiler sections 86, 88 was eleven inches, the maximum spacing between the adjacent sections 86, 88 was 1.75 inches, and the maximum inside spacing between the walls 90, 92 was 0.75 inches. The boiler 20 had a two gallon water capacity. The heat delivery to the water in the boiler 20 was 120,000 B. t. u. per hour, with combustion gases being delivered from the burner at a velocity of about 4000 ft./min. With the water circulating pump not operating, this unit was found capable of raising the temperature of water in the boiler 100° F. in approximately one minute.

Due to the irregular shape of the boiler surfaces, as well as the variety of curved surfaces that can be utilized for the boiler sections (i. e., cylindrical, spiral etc.), it is not possible to state with absolute precision the dimensional limits applicable to a boiler-burner unit constructed in accordance with the invention. However, tests indicate that good heat transfer from the high velocity combustion gases to the water being heated can be obtained with a maximum spacing between the adjacent boiler sections or jackets 86, 88 of less than twenty-five percent of the mean diameter of the jackets 86, 88. An alternative dimensional relation that provides a satisfactory guide is to have the maximum jacket spacing no greater than about three times the maximum internal separation of the walls 90, 92, it being understood that the maximum wall separation is limited by the wall thickness and the spacing of the seals 96, 106 for safe pressure handling capabilities.

Because of the very thin film of water inside the boiler, it is rather important that the water be circulated promptly through the boiler when the burner comes on. Otherwise, it is possible for the thin walled boiler to become overheated.

In order to avoid the possibility of overheating, the control system for the boiler-burner unit of the present invention preferably is so arranged that the burner cannot be ignited until water flow through the boiler is established. While there are, of course, various ways in which this can be accomplished, as by means of time delay relays in the burner circuit and the like, a preferred arrangement is to have the burner control circuit directly controlled by operation of the water circulating pump. A circuit for accomplishing this is shown in Fig. 6, which constitutes an electrical wiring diagram for the boiler-burner unit of Fig. 1.

In the circuit of Fig. 6, a pair of input leads 118 from the usual power suorce (not shown) are connected to the primary winding 120 of a power transformer 122 through the contacts 123 of an aquastat switch 124. The circuit of the secondary winding 126 of the power transformer has three partially parallel branches. One includes the control winding 128 of an ignition control relay 130, the contacts 132 of a bimetallic thermostat element 134, and the contacts 136 of a bimetallic safety switch 138. The second branch includes the control winding 140 of a motor control relay 142, two contacts 144, 145 of a thermostatic "stack" switch 146, a heating element 148 for the safety switch 138, one set of contacts 150 of the ignition relay 130, and the contacts 132, 136 previously mentioned. The third branch circuit of the secondary 126 comprises the winding 140, a second pair of contacts 144, 147 of the stack switch 146, one set of contacts 152 of the motor control relay 142, and the contacts 132, 136.

A first circuit connected to the power transformer primary winding 120 includes a second set of contacts 156 of the ignition control relay 130, the primary winding 158 of an ignition transformer 160, and a pair of contacts 161, 162 associated with the circulating pump motor 164 as explained in detail hereinafter. A second circuit connected to the power transformer primary winding 120 includes a second set of contacts 166 of the motor control relay 142, a fuel valve control element 168, the blower motor 48 (connected in parallel with the fuel valve control 168), and the contacts 161, 162 previously mentioned. An alternative to the circuit just described includes the motor relay contacts 166, the contacts 170, 171 of a second aquastat switch 172, and the starting and running windings 174, 176 of the circulating pump motor 164.

The aquastat switch 172 also has an additional contact 173 so arranged that the circulator motor 164 can be connected directly across the power input leads 118. It will be understood that the control element 168 comprises an electrically actuated valve in the fuel supply line for the burner, such valves being well known and usually consisting of a solenoid device that will close and open the valve as current through the control element is turned on and off. As shown schematically in Fig. 6a, for example, the control may comprise a solenoid valve 169 in the fuel line 66, actuated by a winding 175.

The circuit of Fig. 6 is shown in the "cold start" condition but with all relays deenergized. That is, the stack switch 146 is in the cold position, the aquastat switches 124, 172 are in the cold position calling for heating of the boiler water, and the thermostat switch 134 is in the cold position calling for heat to be supplied by the system. When the thermostat switch 134 closes (to the position shown), the ignition relay 130 will be actuated, closing both sets of contacts 150, 156. The contacts 150 will complete a circuit to energize the motor relay 142, thereby closing the contacts 152, 166 thereof. When the ignition relay contacts 156 close, a circuit will be partially completed for the ignition transformer primary winding 158, up to the contact 161 at the circulating pump motor. Also, when the motor relay contacts 166 close, a circuit will be partially completed through the fuel valve control 168 and the blower motor 48, up to the contact 161 at the circulating pump motor 164. Simultaneously, a circuit will be completed through the motor control relay contacts 166, the aquastat switch 172 and the starting winding 174 of the circulating pump motor, starting the circulating pump in operation. Thus far, only the circulating pump will be energized. When the circulating pump comes up to speed, the usual centrifugally actuated contact 162 will move away from the contact 163, cutting the starting winding 174 out of the circuit. Simultaneously, the starting winding contact 162 will swing over to complete the ignition and blower motor circuits at the contact 161. Accordingly, it is evident that the ignition, fuel and blower circuits cannot be energized until the circulating pump has reached operating speed.

While the foregoing constitute the important operational features of the circuit of Fig. 6 as far as the present invention is concerned, a brief description of the operation of the remainder of the circuit will be given for the sake of completeness.

The safety switch heater 148 will begin to pass current immediately upon closure of the ignition contacts 150. The safety switch 138 has a predetermined delay reaction and will open due to the heating action of the heater 148 after a fixed interval if the heater 148 continues to conduct current indefinitely. If the switch 138 opens, it will cut off all the burner circuits. However, if the burner is functioning properly the stack switch 146 will respond to the heating effect of the flue gases, and the contacts 144, 147 thereof will close, cutting the safety switch heater 148 out of the circuit so that the safety switch will not open the burner circuit.

One set of aquastat contacts 123 constitute an upper limit control which will open and deenergize the burner when the boiler water reaches a predetermined high temperature, regardless of the condition of the rest of the circuit. The second set of aquastat contacts 170, 171, 173 will change the circulating pump circuit when the boiler water has reached a predetermined temperature, placing the circulating pump motor 164 directly across the power line 118 so that the water will continue to circulate and deliver any heat stored in the boiler to the radiators after the thermostat has been satisfied and the burner has been turned off.

In the complete assembly of Fig. 1, the majority of the circuit elements just described are mounted in a controls box 174 on the outside of the inner casing 18, and are accessible for adjustment and servicing by provision of a removable panel 176 in the lower housing wall. The stack switch bimetal element (not shown in Fig. 1) extends through a housing 177 into the flue outlet 100. The aquastat elements (not shown in Fig. 1) are placed in T-fittings 178 in the water outlet line 116 from the boiler 20. The thermostat 134, of course, will be suitably located in the space to be heated.

The circulating pump 108 and motor 164 are located in the lower housing section 12 below the control box 174.

Thus, it can be seen that all of the components of the boiler-burner unit are disposed and arranged for easy access and most efficient space utilization. By way of example, the dimensions of the housing 10, 12 need be no greater than twenty by twenty-six inches at the base 13 and forty inches high, for a unit with an output of the order of 100,000 B. t. u./hr. By removing the upper casing section 10, the entire burner assembly 38 is exposed, and by tilting back the cover 24, the combustion elements of the burner 38 as well as the entire outer surface of the boiler can be readily examined and cleaned or otherwise serviced as required. By removing the panel 176, the controls box 174 and the motor-pump assembly 108, 164 become immediately available for servicing. It is apparent, therefore, that the entire assembly is unusually simple to service and adjust, as well as being compact, light-weight and easy to handle in installing, and extremely efficient in operation.

We claim:

1. In a boiler-burner unit, a substantially cylindrical casing, a boiler comprising a plurality of open ended substantially cylindrical envelopes coaxially disposed in closely spaced relation one within the other and standing on end within said casing, said envelopes each having an opening extending from end to end thereof, said openings being on opposite sides of adjacent ones of said envelopes thereby providing two similar continuous paths each extending from the space encompassed by the innermost of said envelopes to outside the outermost of said envelopes, said envelopes each having thin sheet metal walls sealed together along their edges and at a plurality of spaced points intermediate said edges and being separated except at said edges and at said points to provide multiple parallel fluid paths within said envelopes, end walls for said casing, and a high velocity fluid fuel burner mounted on one of said casing end walls to discharge hot combustion products at a velocity substantially in excess of the velocity of flame propagation of the fuel supplied to said burner.

2. In a boiler-burner unit, a multilayer heat-exchanging water jacket enclosing a generally cylindrical space at the center thereof, said water jacket comprising means including curved thin metal walls forming (1) a continuous water passageway, extending from the innermost to the outermost of said layers and (2) a continuous combustion gas passageway extending between said layers from said cylindrical space to outside the outermost of said layers, said walls being formed to have quilt-like surfaces which are in contact at their edges and at a plurality of spaced points intermediate said edges and which are separated at all other points, a high-velocity fluid-fuel burner mounted to discharge hot combustion products directly into said space, said burner being of a type adapted to provide a flow of hot gaseous combustion products at a velocity substantially in excess of the velocity of flame propagation of the fuel supplied to said burner, water circulating means having water lines communicating with the interior of said jacket to circulate water to be heated through said jacket, and burner control means responsive to operation of said circulating means and coupled to said burner to delay operation of said burner for a predetermined time after said circulating means begins to operate.

3. In a boiler-burner unit, a multilayer heat-exchanging water jacket, said jacket layers comprising pairs of thin sheet metal walls sealed together at their edges and at a plurality of spaced points intermediate said edges and separated except where sealed together to provide multiple fluid paths within said jacket, said jacket layers being coupled together to provide a continuous fluid path from the innermost to the outermost of said layers, the innermost of said layers encompassing a substantially cylindrical space, said jacket being shaped to define between said layers a continuous path extending from said space encompassed by the innermost of said layers to the outermost of said layers, the maximum spacing between the walls of adjacent ones of said layers being no greater than about three times the maximum inside separation of said walls, a high-velocity fluid-fuel burner mounted to discharge hot combustion products directly into said encompassed space, said burner being of a type adapted to provide a flow of hot gaseous combustion products at a velocity substantially in excess of the velocity of flame propagation of the fuel supplied to said burner, a motor, a pump driven by said motor and communicating with the interior of said jacket to circulate water to be heated through said jacket, means including a fuel line to supply liquid fuel to said burner, a normally closed valve in said fuel line, and means responsive to operation of said pump motor for opening said valve a predetermined time after said pump motor begins to operate.

4. In a boiler-burner unit, a multilayer heat-exchanging water jacket enclosing a generally cylindrical space at the center thereof, said water jacket comprising means including curved thin metal walls forming (1) a continuous water passageway, extending from the innermost to the outermost of said layers and (2) a continuous combustion gas passageway extending between said layers from said cylindrical space to outside the outermost of said layers, said walls being formed to have quilt-like surfaces which are in contact at their edges and at a plurality of spaced points intermediate said edges and which are separated at all other points, a high-velocity fluid-fuel burner mounted to discharge hot combustion products directly into said cylindrical space, said burner being of a type adapted to provide a flow of hot gaseous combustion products at a velocity substantially in excess of the velocity of flame propagation of the fuel supplied to said burner, a fuel delivery line leading to said burner, a circulating pump, a water line leading from said pump to the interior of said jacket, a motor for driving said pump, a centrifugally actuated switch on said motor, and an electrically actuated valve in said fuel line connected to be controlled by said switch to prevent fuel flow through said fuel line until said motor reaches a predetermined operating speed.

5. In a boiler-burner unit, a substantially cylindrical casing, a boiler comprising a plurality of open-ended substantially cylindrical envelopes coaxially disposed in closely spaced relation one within the other within said casing, said envelopes each having an opening extending from end to end thereof, said openings being on opposite sides of adjacent ones of said envelopes thereby providing two similar continuous paths each extending from the space encompassed by the innermost of said envelopes to outside the outermost of said envelopes, said envelopes each having thin sheet metal walls sealed together along their edges and at a plurality of spaced points intermediate said edges and being separated except at said edges and at said points to provide multiple parallel fluid paths within said envelopes, end walls for said casing, one of said casing end walls having a fluid fuel burner mounted thereon to discharge hot combustion products directly into said encompassed space, a circulating pump, a water line leading from said pump to inside the innermost of said envelopes at a point in the periphery thereof opposite said opening therein, fluid coupling means connecting the interiors of adjacent ones of said envelopes, a water outlet line connected with the interior of the outermost of said envelopes, a motor for driving said pump, a centrifugally actuated switch on said motor, and an electrically actuated valve connected to be controlled by said switch to prevent fuel supply to said burner until said motor reaches a predetermined operating speed.

6. In a boiler-burner unit, an upright substantially cylindrical casing closed at its lower end and having an open upper end, an insulated cover plate hinged to said casing and adapted to close tightly over said upper end, a water jacket inside said casing, a high-velocity fluid-fuel burner mounted on said cover plate to discharge hot combustion products onto the surfaces of said water jacket, said burner being of a type adapted to provide a flow of hot gaseous combustion products at a velocity substantially in excess of the velocity of flame propagation of the fuel supplied to said burner, and means to supply a combustible fluid to said burner, said supply means including a fuel supply line of relatively ductile metal having a flexible portion comprising a plural-turn coil section in said line.

7. In a boiler-burner unit, an upright substantially cylindrical casing having an open top, a circular cover plate hinged to the top of said casing and having an opening in the center thereof, a high velocity fluid fuel burner mounted on said cover plate above said center opening, said burner comprising a substantially cylindrical sleeve defining a combustion space extending into said casing through said cover plate opening when said cover plate is closed, means to supply a combustible fluid to said combustion space, said supply means including a fuel supply line of relatively ductile metal having a flexible portion comprising a coil of several turns, a boiler inside said inner casing, said boiler comprising a plurality of cylindrical envelopes coaxially disposed in closely spaced relation one within the other and each having a longitudinal slot in the walls thereof, said slots being on opposite sides of adjacent ones of said envelopes thereby providing two similar curvilinear continuous paths from a space encompassed by the innermost to outside the outermost of said envelopes, said encompassed space forming a continuation of said combustion space when said cover plate is closed.

8. In a boiler-burner unit, an upright substantially cylindrical casing having an open upper end, an insulated circular cover plate hinged to said casing to close downwardly over said casing upper end and having an opening in the center thereof, a high velocity liquid fuel burner mounted on said cover plate, a boiler comprising a plurality of open-ended substantially cylindrical envelopes coaxially disposed in closely spaced relation one within the other and standing on end within said inner casing, the open upper ends of said envelopes terminating adjacent the upper end of said casing so as to be closed by said cover plate when said cover plate is in closed position relative to said casing, said envelopes each having an opening extending from end to end thereof, said openings being on opposite side of adjacent ones of said envelopes providing a combustion gas path between said envelopes from the space encompassed by the innermost envelope to outside the outermost of said envelopes.

9. In a boiler-burner unit, a boiler comprising a plurality of open ended substantially cylindrical envelopes disposed in closely spaced relation one within the other, said envelopes each having an opening extending from end to end thereof, said openings being on opposite sides of adjacent ones of said envelopes to provide two continuous paths each extending from the space encompassed by the innermost of said envelopes to the opening in the outermost of said envelopes, said envelopes each having thin sheet metal walls sealed together at their edges and at a plurality of spaced points intermediate said edges and separated except where sealed together to provide multiple parallel fluid paths within said envelopes, end walls closing the open ends of said envelopes, and a burner mounted on one of said end walls to discharge hot combustion products into said space encompassed by the innermost of said envelopes.

References Cited in the file of this patent

UNITED STATES PATENTS

| Number | Name | Date |
|---|---|---|
| 1,828 | Pickard | Oct. 14, 1840 |
| 279,920 | Cox | June 26, 1883 |
| 332,357 | Orloff | Dec. 15, 1885 |
| 710,130 | Weiss | Sept. 30, 1902 |
| 870,821 | Hall | Nov. 21, 1907 |
| 1,236,793 | Warman | Aug. 14, 1917 |
| 1,356,098 | Trumble | Oct. 19, 1920 |
| 1,709,865 | Muffly | Apr. 23, 1929 |
| 1,841,230 | Vuia et al. | Jan. 12, 1932 |
| 1,892,188 | Goodridge | Dec. 27, 1932 |
| 1,916,625 | Matteson | July 4, 1933 |
| 1,971,488 | Jorgensen | Aug. 28, 1934 |
| 2,001,515 | Barrow | May 14, 1935 |
| 2,047,471 | Hepburn et al. | July 14, 1936 |
| 2,064,141 | Askin | Dec. 15, 1936 |
| 2,110,209 | Engels | Mar. 8, 1938 |
| 2,210,736 | Thoresen | Aug. 6, 1940 |
| 2,210,853 | Falkenberg | Aug. 6, 1940 |
| 2,255,276 | Breese | Sept. 9, 1941 |
| 2,347,957 | McCullough | May 2, 1944 |
| 2,349,695 | Bean | May 23, 1944 |
| 2,379,018 | McCollum | June 26, 1945 |
| 2,422,178 | Blizard | June 17, 1947 |
| 2,448,648 | Zideck | Sept. 7, 1948 |
| 2,481,512 | Hubbell | Sept. 13, 1949 |
| 2,552,044 | Huet | May 8, 1951 |
| 2,581,316 | Wolfersperger | Jan. 1, 1952 |
| 2,582,358 | Schoellerman | Jan. 15, 1952 |
| 2,593,032 | Johnson | Apr. 15, 1952 |
| 2,611,599 | MacCracken | Sept. 23, 1952 |

FOREIGN PATENTS

| Number | Country | Date |
|---|---|---|
| 8,891 | Great Britain | June 12, 1884 |
| 617,000 | France | Feb. 11, 1927 |